United States Patent
Sangai (10) Patent No.: US 11,968,531 B2
(45) Date of Patent: Apr. 23, 2024

(54) TOKEN, PARTICULARLY OTP, BASED AUTHENTICATION SYSTEM AND METHOD

(71) Applicant: Giesecke+Devrient Mobile Security GmbH, Munich (DE)

(72) Inventor: Shreyas Sangai, Pune (IN)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 217 days.

(21) Appl. No.: 17/825,322

(22) Filed: May 26, 2022

(65) Prior Publication Data

US 2022/0386123 A1    Dec. 1, 2022

(30) Foreign Application Priority Data

May 27, 2021    (EP) ..................... 21020281

(51) Int. Cl.
*H04W 12/06* (2021.01)
(52) U.S. Cl.
CPC ............................. *H04W 12/068* (2021.01)
(58) Field of Classification Search
CPC ..... H04W 12/068; H04W 4/14; H04W 12/02; H04L 63/20; H04L 63/0838; H04L 63/0853; H04L 63/18; H04L 2463/082
See application file for complete search history.

(56) References Cited

U.S. PATENT DOCUMENTS

| | | | |
|---|---|---|---|
| 9,419,968 B1 * | 8/2016 | Pei | G06F 21/31 |
| 10,277,586 B1 * | 4/2019 | Yau | H04L 63/0807 |
| 10,826,895 B1 * | 11/2020 | Krut | H04L 9/0894 |
| 2011/0145899 A1 * | 6/2011 | Cao | H04L 9/3226 726/7 |
| 2014/0136419 A1 * | 5/2014 | Kiyohara | G06Q 20/40145 705/67 |
| 2015/0215305 A1 * | 7/2015 | Wetzel | H04W 12/06 726/9 |
| 2016/0127902 A1 * | 5/2016 | Ciarniello | G06F 21/43 380/247 |
| 2017/0228723 A1 * | 8/2017 | Taylor | G06Q 20/367 |
| 2019/0036897 A1 * | 1/2019 | Miller | H04L 69/22 |
| 2020/0067904 A1 * | 2/2020 | Hugot | G06F 21/31 |

(Continued)

FOREIGN PATENT DOCUMENTS

| | | |
|---|---|---|
| EP | 2456157 A1 | 5/2012 |
| EP | 3266181 B1 | 9/2020 |

(Continued)

OTHER PUBLICATIONS

Search Report from corresponding European Application No. 21020281.8, dated Nov. 22, 2021.

*Primary Examiner* — Khalid M Almaghayreh
(74) *Attorney, Agent, or Firm* — Workman Nydegger (57) ABSTRACT

A method for authenticating a mobile device of a user versus a third-party such that instead of a mobile phone number MSISDN of the mobile device, a Universal Unique User Identifier, U3I, assigned to the mobile device is used, in combination with a secure routing service server constructed to communicate with a third-party server and with an MNO server. The secure routing service server and the MNO server interact to translate the Universal Unique User Identifier, U3I, to the mobile phone number MSISDN so as to enable sending the token to the mobile device.

14 Claims, 2 Drawing Sheets

(56) References Cited

U.S. PATENT DOCUMENTS

| | | | |
|---|---|---|---|
| 2020/0288298 A1* | 9/2020 | Li | H04W 8/183 |
| 2022/0116385 A1* | 4/2022 | Hertrich | H04L 9/3213 |
| 2022/0116386 A1* | 4/2022 | Matute | H04L 63/18 |

FOREIGN PATENT DOCUMENTS

| | | | | |
|---|---|---|---|---|
| WO | 0128273 | A1 | 4/2001 | |
| WO | WO-2014198745 | A1 * | 12/2014 | G06F 21/335 |
| WO | 2018167298 | A1 | 9/2018 | |

\* cited by examiner

Fig. 1

Fig. 2

TOKEN, PARTICULARLY OTP, BASED AUTHENTICATION SYSTEM AND METHOD

FIELD OF THE INVENTION

The present invention relates to an authentication system and method based on a token, particularly on a One Time Password—OTP.

BACKGROUND OF THE INVENTION

For communication of mobile devices (e.g., smartphone) in mobile networks, each mobile device, or more precisely an eUICC (of any form factor; e.g., embedded UICC or plug-in SIM card) hosted in the mobile device, is assigned a set of subscriber data associated with a Mobile Network Operator MNO. Amongst the subscriber data there is the International Mobile Subscriber Identity IMSI and the mobile phone number MSISDN (Mobile Subscriber Integrated Services Digital Network Number; or Mobile Station Integrated Services Digital Network Number). The subscriber data are stored in the eUICC. Newer eUICCs have Remote SIM Provisioning, RSP, capability, allowing to provide subscriber data to the eUICC when the eUICC is in the field already, in a mobile device at a user of the mobile device. Older eUICCs, such as SIM cards, have a fixed set of subscriber data. The set of subscriber data including for example IMSI, and authentication key Ki is often referred to as a profile or subscription profile. Originally, the MSISDN was intended merely to allow the user to communicate in the mobile network with the mobile device.

With the increasing usage of smartphones and everything going digital, smartphone users download multiple third-party mobile apps to their smartphones, or log into websites with their smartphones. The same holds for mobile devices having mobile connectivity similar to smartphones, like tablet PCs. Upon download of a mobile app to a smartphone, the mobile app or the third-party providing the app establishes an account for the smartphone user at a third-party server system of said third-party and links the downloading smartphone's phone number MSISDN to said account. The third-party uses the linked phone number to verify the phone number by sending a one-time password or OTP which the user has to send back to the third-party company server through its downloaded app. This verifies the validity of the phone number, however it also forces the user to disclose its phone number to the third-party company which the third-party company stores in its database, implied in or connected to its server system, and on which the user has no control. This database either can be hacked and the phone numbers can be stolen or a malicious third-party company might sell the phone numbers to other companies like for example telemarketers which may call you at any time.

The problem of the above-described hack scenario is the originally not intended usage extension of the MSISDN to transport a token (e.g., OTP) for third-party authentication.

Document EP3266181B1 of the prior art discloses an OTP based authentication method for authentication of a user of a PDA versus a recipient, involving an authentication server. Herein, the PDA sends to the recipient a token ID by which generation of an OTP and of a password is initiated. The OTP is sent from the recipient to the PDA via an authentication server. The password is sent directly to the PDA, thus requiring the recipient being able to identify the PDA. Finally, the PDA returns both the password and the OTP to the recipient.

Document WO2018167298A1 discloses user ID verification delegated from a first server to a second server. EP2456157B1 discloses anonymous sign in of a user to a web service, comprising authentication of the web service versus the user by an authentication service.

OBJECTIVE OF THE INVENTION

It is an object of the present invention to provide an authentication system and method based on a token, particularly on a One Time Password—OTP, enabling to better safeguard privacy of the person desiring authentication.

SUMMARY OF THE INVENTION

The object of the invention is achieved by a system and method with the following features, according to the independent claims. Embodiments of the invention are presented in dependent claims.

In particular, there is provided a method for authenticating a mobile device of a user versus a third-party, via a token, e.g. OTP, based authentication method, wherein instead of a mobile phone number MSISDN of the mobile device, a Universal Unique User Identifier, also briefly named U3I in the following, assigned to the mobile device is used, in combination with a secure routing service server. The secure routing service server is constructed to communicate with a third-party server of said third-party and with an MNO server to which the mobile phone is associated. The secure routing service server and the MNO server interact to translate the Universal Unique User Identifier, U3I, to the mobile phone number MSISDN so as to enable sending the token to the mobile device.

Throughout the entire system and method, the mobile phone number MSISDN of the mobile device is kept concealed and hidden from the third-party server. Therefore, the privacy of the mobile phone user versus the third-party is safeguarded. The mobile phone number MSISDN of the mobile device is kept concealed and hidden also from the secure routing service server, which is aware only of the Mobile Network Operator MNO associated with the Universal Unique User Identifier, U3I, however not of the particular mobile phone number MSISDN.

Therefore, the present invention provides for an authentication system and method based on a token, particularly on a One Time Password— OTP, enabling to better safeguard privacy of the person desiring authentication.

A system for authenticating a mobile device of a user versus a third-party comprises:
(a) a third-party server constructed to
   receive from a requesting device an authentication request, requesting to authenticate the mobile device;
   in reaction, send an authentication token to be received at the mobile device;
   receive back the authentication token; and
   upon successful receipt back of the authentication token, acknowledge the mobile device (10) as authenticated;
(b) the mobile device;
(c) an MNO server of the Mobile Network Operator MNO to which mobile device is assigned.

The system is characterized by:
(d) a secure routing service server constructed to communicate with the third-party server and with the MNO server;
(e) a Universal Unique User Identifier, U3I, assigned to the mobile device;

(f) the U3I of (e) being registered at the MNO server and assigned to the registered mobile phone number (e.g., MSISDN) of the user;

(g) the U3I of (e) being registered at the secure routing service server and assigned to the Mobile Network Operator MNO, wherein the secure routing service server doesn't provide of the user's mobile phone number;

(h) the authentication request received at the third-party server comprising the U3I of (e);

(i) the third-party server being constructed to send the authentication token and the U3I to the secure routing service server;

(j) the secure routing service server being constructed to
receive from the third-party server the authentication token and the U3I;
retrieve a Mobile Network Operator MNO to which the U3I is assigned; and
send the authentication token and the U3I to the MNO server of the retrieved MN);

(k) the MNO server constructed to:
receive from the secure routing service server the authentication token and the U3I; retrieve the mobile phone number assigned to the U3I; and
send the authentication token to the mobile device using the retrieved mobile phone number.

According to some embodiments, the authentication token is a One Time Password OTP.

According to some embodiments, the requesting device is the same device as the mobile device, or a device different from the mobile device. In case the requesting device is a different device, it can for example be a computer, such as a PC or notebook.

According to some embodiments, the Universal Unique User Identifier, U3I, and/or the subscriber data, and particularly the mobile phone number, e.g., MSISDN, are assigned to an eUICC hosted in the mobile device.

A method for authenticating a mobile device (10) of a user versus a third-party, is characterized by involving:

(d) a secure routing service server constructed to communicate with the third-party server (20) and with the MNO server;

(e) a Universal Unique User Identifier, U3I, assigned to the mobile device;

(f) the U3I being registered at the MNO server responsible of the mobile device and assigned to the registered mobile phone number of the user;

(g) the U3I being registered at the secure routing service server and assigned to the Mobile Network Operator MNO responsible of the mobile device, wherein the secure routing service server doesn't provide of the user's mobile phone number;

(h) the authentication (a) request received at the third-party server comprising the U3I.

The method is further characterized by following method steps:

(i) by the third-party server, send the authentication token, for example an OTP, and the U3I of (e) to the secure routing service server;

(j) by the secure routing service server:
receive from the third-party server the authentication token and the U3I of (e);
retrieve a Mobile Network Operator MNO to which the U3I is assigned; and
send the authentication token and the U3I to the MNO server of the retrieved MNO;

(k) by the MNO server:
receive from the secure routing service server the authentication token and the U3I;
retrieve the mobile phone number assigned to the U3I; and
send the authentication token to the mobile device using the retrieved mobile phone number.

According to some embodiments, the method further comprises: (i) at the third-party server or instructed by the third-party server, generate the authentication token.

The method according to some embodiments further comprised the steps:
(l) registering the third-party server to the secure routing service server; and upon step (j):
(j) at the secure routing service server:
verify that the third-party server from which the authentication token and the U3I are received is registered to the secure routing service server; and
proceed to retrieve a Mobile Network Operator MNO and send the authentication token and the U3I to the MNO server of the retrieved MNO only under the condition that the third-party server is registered.

According to some embodiments, the step (i) by the third-party server, sending the authentication token and the U3I of (e) to the secure routing service server, is performed via a secure communication channel, particularly an HTTPs channel, between the third-party server and the secure routing service server.

According to some embodiments, the authenticating is performed on the occasion of taking over a software element offered on the third-party server for use by the mobile phone, the taking over of the software element being performed by:
either downloading of the software element, particularly an app, from the third-party server to the mobile device,
or logging in to the software element, particularly a website, constructed to be run on the third-party server, by the mobile device;

the method further comprising the steps:
(l) registering the software element offered at the third-party server to the secure routing service server; and
upon step (j):
(j) at the secure routing service server:
verify that software element offered on the third-party server for which the authentication token and the U3I are received is registered to the secure routing service server; and
proceed to retrieve a Mobile Network Operator MNO and send the authentication token and the U3I to the MNO server of the retrieved MNO only under the condition that the software element, particularly an app, offered on the third-party server is registered.

According to some embodiments, the method further comprises the steps:
(l) for registering, providing a secret API key to the software element;
(j) upon step (j), by the software element, providing the secret API key to the secure routing service server;—by the secure routing service server, verifying the secret API key provided by the software element.

According to some embodiments, in step (a),
the sub-step to send an authentication token to be received at the mobile device is performed via a mobile network, particularly via Short Message Service SMS; and/or in step (a),
the sub-step to receive from the requesting device an authentication request, requesting to authenticate the mobile device, is performed via a communication channel different from a mobile network, particularly such that a mobile phone number MSISDN is not required for use of the communication channel; and/or the sub-step to receive back the authentication token is performed via a communication channel different from a mobile network, particularly such that a mobile phone number MSISDN is not required for use of the communication channel.

The authentication method of the present invention, using the U3I and the authentication token, can be applied to download of a software, for example an app, to a mobile device such as a mobile phone, and can also be applied to login to a website with the mobile device. In addition, the method can be applied to sending to the mobile device other contents such as advertisements, either instead of or in addition to an authentication token, using the method steps described for sending the authentication token (e.g., OTP).

BRIEF DESCRIPTION OF THE DRAWINGS

Embodiments of the invention will be described with reference to the accompanying drawings, throughout which like parts are referred to by like references, and in which represents.

DETAILED DESCRIPTION OF THE INVENTION

Figure 1:
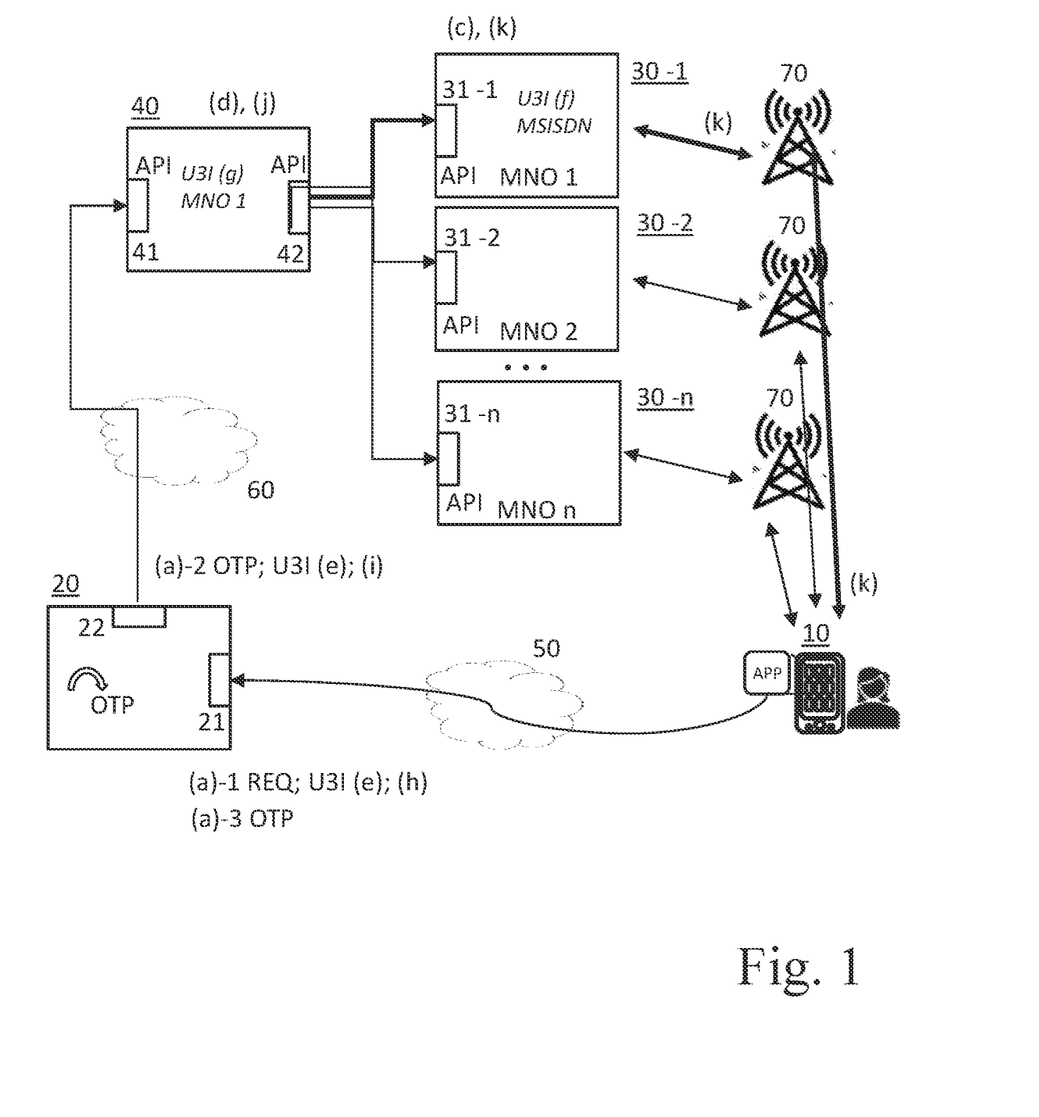
FIG. 1 a system for authenticating a user of a mobile device versus a third-party, according to an embodiment of the invention.
Figure 2:
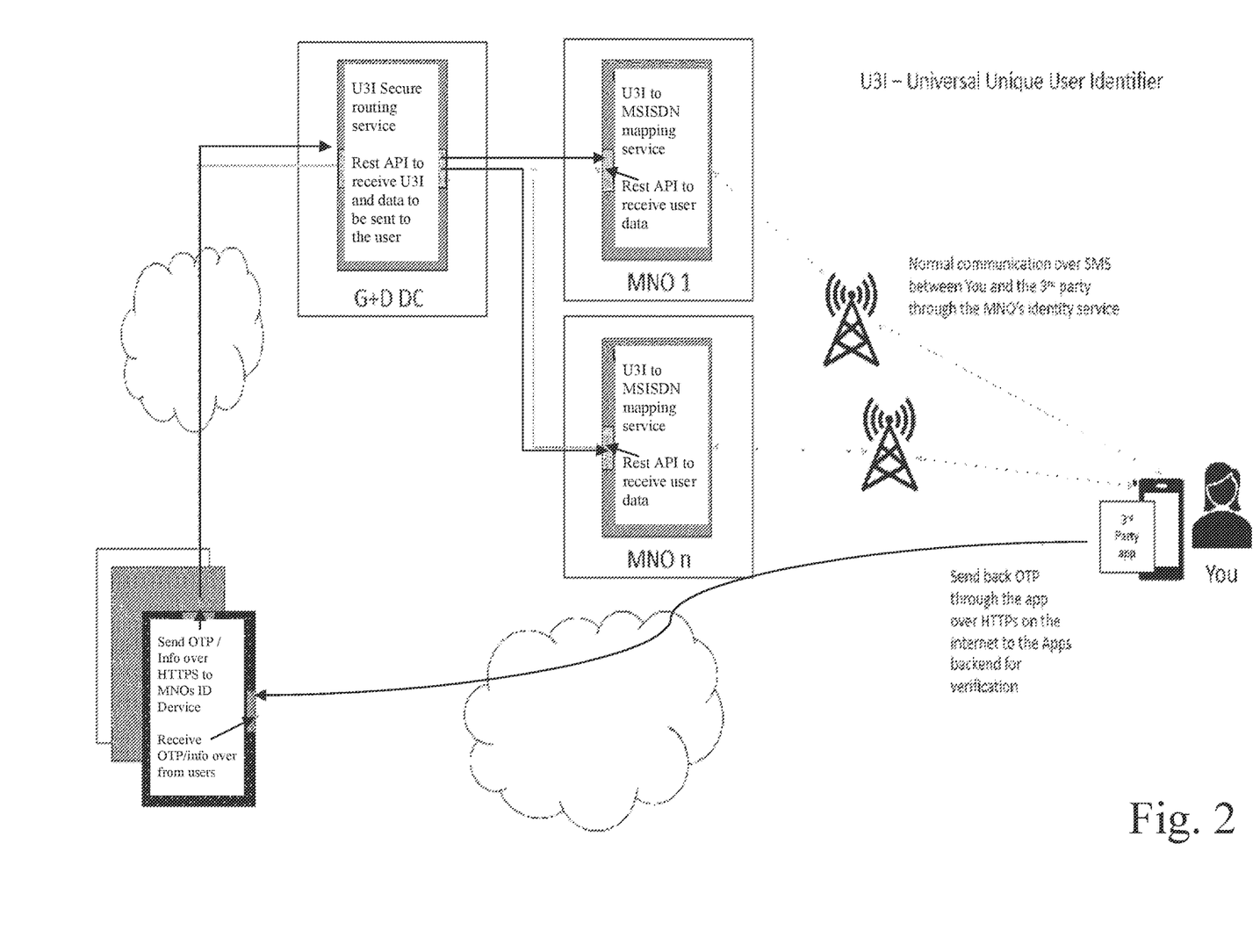
FIG. 2 a system for authentication, similar to the system of FIG. 1.

FIG. 1 shows a system for authenticating a user of a mobile device 10 versus a third-party, according to an embodiment of the invention. The system comprises: a mobile device 10 to which an app of a third-party shall be downloaded, a third-party server 20, several MNO servers 30 of several Mobile Network Operators MNO—MNO 1, MNO 2, . . . , MNO n, and a secure routing service server 40. The app on the mobile device 10 and the third-party server 20 communicate via a network connection 50, for example an internet connection, between the app and an app interface 21 of the third-party server 20. The third-party server 20 and the secure routing service server 40 communicate via a secured network connection 60, for example a HTTPs connection via the internet. The secure routing service server 40 and the MNO server(s) 30 communicate via an interface 42, e.g., rest API interface, of the secure routing service server 40 and interfaces 31, e.g., rest API interfaces, of the MNO server(s) 30. The MNO server(s) 30 communicate with the mobile device 10 via a mobile network 70. The mobile device 10 provides of a eUICC (not shown) with at least one subscription profile implemented and enabled therein.

The third-party server 20 is in the example of FIG. 1 an app provider backend server of an app provider offering OTP authentication services for apps of said app provider offered for download from e.g., an app store to mobile devices such as the mobile device 10. The apps can be downloaded to mobile devices via an internet network connection 50. The request mechanism for OTP services for authentication in connection with an app download can as well be via an internet network connection 50, either the same or a different one. The app provider requests a mobile device 10 user desiring to download an app to his/her/its mobile device 10 and set the app into operation to authenticate him/her/itself via an OTP—One Time Password— mechanism. Herein, the user downloads the app from an app store or the like to the mobile device 10. The app requests the user to request for an OTP via the downloaded app. The user requests, via the downloaded app, for an OTP. The app is constructed to direct the user request to the correct third-party server 20, e.g., the backend server of said app provider. The request for an OTP is thus sent to the third-party server 20 via the app. According to the invention, the mobile phone number MSISDN is not sent to the third-party server 20 with the OTP request, instead the Universal Unique User Identifier U3I is sent to the third-party server 20 together with the OTP request.

The third-party server 20 generates an OTP and sends the OTP and the Universal Unique User Identifier U3I to the secure routing service server 40 via a secured network connection 60, for example a HTTPs connection via the internet.

The secure routing service server 40 stores, in a database, a list of Universal Unique User Identifiers U3I of all eUICCs registered for the secure routing service of the secure routing service server 40, together with an indicator of the Mobile Network Operator MNO (MNO1 or MNO 2 or . . . or MNO n) to which the respective eUICC is registered. The secure routing service server 40 doesn't have knowledge of the particular mobile phone number MSISDN associated to the respective eUICCs. The secure routing service server 40 looks up, in its database, the MNO associated with the Universal Unique User Identifiers U3I received with the OTP and forwards the Universal Unique User Identifier U3I and the OTP to the correct MNO server 30 of the retrieved MNO. The secure routing service server 40 can comprise only one server or several interconnected servers.

The MNO servers 30 -1, -2, . . . -n store data associated to subscriber data of profiles loaded and installed to eUICCs, herein data for subscriber data of the eUICC of the mobile device 10. For the eUICC of the mobile device 10, particularly a mobile phone number MSISDN is stored on the MNO server 30. According to the invention, for the eUICC of the mobile device 10, in addition to the mobile phone number MSISDN, a Universal Unique User Identifier U3I is stored associated with the stored MSISDN. The MNO server 30 retrieves, from the Universal Unique User Identifier U3I received from the secure routing service server 40 together with the OTP, the associated mobile phone number MSISDN and forwards the received OTP to the mobile device 10 via the mobile network 70, for example in an SMS.

The mobile device 10 receives the OTP, for example the SMS with the OTP. The user reads the OTP and enters the OTP into an entry mask of the downloaded app on the mobile device 10. Alternatively, the app can automatically import the received OTP into the app. The app sends the OTP back to the third-party server 20 via the network connection 50, e.g., via internet. The third-party server 20 receives the OTP sent by the app. In case the received OTP is correct, i.e., the same OTP as the originally sent OTP, the third-party server 20 accepts and acknowledges the user as authenticated and allows the app on the mobile device 10 to be set into full functionality.

Preferably, every third-party server 20 and every software element and every app intended for making use of the U3I and token (e.g., OTP) based authentication service has to register with the secure routing service server 40 in advance to be permitted to the secure routing service offered by the server 40.

Particularly for software elements such as apps (or websites), the registration can imply that the respective software element or app is provided with an API key which the software element or app has to present to the secure routing service server 40. The interfaces on the secure routing service server 40 and/or on the MNO servers 30 are corresponding APIs (API=Application Programing Interface), matching with the API keys provided to software elements such as apps (or websites). Only for software elements or apps having a correct API key, the third-party server 20 will be permitted to pass an authentication task, including a token (e.g., OTP) and U3I, through the interface 41 onwards to the secure routing service server 40. Particularly, the APIs (Application Programming Interfaces) can be REST APIs (Representational State Transfer APIs) or HTTPS APIs or json APIs or similar suitable APIs.

Solution according to a preferred embodiment of the invention:

Instead of providing the phone number MSISDN in the third-party app, the user will provide the U3I to it.

1. Every user will be given a "Universal Unique User Identifier", in the following called U3I. Herein, each U3I is assigned to a particular MNO.
2. U3I as the name suggests is a universally unique identifier assigned to every user account at an MNO, like a MSISDN or an IMSI which can be used by the third-party apps to verify a MSISDN or communicate with the user without knowing the users MSISDN.
3. The Universal Unique User Identifier U3I can either be provided along with the MNO profile when providing the profile to the eUICC, or the U3I can be generated and provided to the existing user, to an already present profile on the eUICC, over the air separately, e.g., via an RSP mechanism.
4. Instead of providing the phone number MSISDN in the third-party app, the user will provide the U3I to it.
5. The third-party app will use the U3I instead of the phone number MSISDN to send an OTP or/and any other info (e.g., advertisements) to the user.
6. To achieve this, a routing server system deploys a service called the U3I routing service which exposes REST APIs to receive the U3I along with the OTP (or other token or other information) over a secured communication channel, here a HTTPs channel, in a suitable format, here a specific json (Java Script Object Notation) format.
7. The U3I routing service has a mapping of the U3I to the MNO it belongs to, taking into account that each U3I is assigned to a particular MNO.
8. The third-party app sends a request over the secure channel, here a HTTP request, which contains the OTP and the further information to the routing server system, to the routing service, and here to the rest API provided by this service.
9. The routing service on the routing server system then sends the OTP and U3I to the appropriate MNO.
10. The MNO's database contains a mapping between U3I and MSISDN (like it has the mapping between MSISDN and IMSI).
11. Using this mapping, the MNO encloses the OTP contained in the request into an SMS and sends the SMS to the user.
12. The user reads the OTP from the SMS and provides the OTP to the third-party app which then verifies the OTP to verify the user via the user's mobile phone number MSISDN, without the MSISDN being disclosed to the third-party.
13. The service can not only be used to send OTPs but also any other information to the user over SMS if the user wishes to receive such info.
14. To avoid anyone randomly calling the routing service, preferably every third-party app using the service will have to register and verify itself with the routing service through a process much like a Certificate Authority signs a certificate. The third-party app is preferably also provided with a secret API key which is used to authenticate and authorize the third-party. This along with TLS/HTTPS or comparable security measures would restrict anyone from randomly calling the routing service to forward malicious data.
15. The difference between other services which provide virtual phone numbers is that in this case the user's MSISDN remains only with the MNO which already has the MSISDN. In case of a virtual phone numbers, you will still have to give your phone number to this third-party service which provides the virtual phone number.

In the foregoing, a use case was described wherein an OTP received on a mobile phone (as an example of a mobile device) through a platform was used for authentication on the occasion of downloading a mobile app from a third-party server to the mobile phone, for the purpose to later run the app on the device. The authentication can, similarly to its use upon app download, also be used to login/sign-up on a website to be run on the third-party server, and to be accessed by the mobile device.

Further embodiment A:

According to an embodiment of the invention, authentication upon login or sign-up to a website to be run on the third-party server works as follows.

1) The user opens, on a mobile phone (device) a browser and loads the website they want to login into.
2) The user either navigates to sign-up page or login page.
3) Instead of asking for the phone number—which is done on a number of websites—the user will be asked to add a U3I on the website's login/sign-up page.
4) The user receives the OTP/token on the mobile phone using the U3I platform, as described above.
5) The user enters the OTP into a field on the website's login or sign-up page to authenticate and login.

Further embodiment B:

According to some embodiments, extra security in the above-described authentication flow is achieved by an additional PIN or password check. The OTP establishes the identity assuming the mobile is in possession of a valid user, however if e.g., the phone is stolen one could login to any website/app that uses the above mechanism. The solution to this problem is to:

1) Protect the flow with a PIN or password in addition to the OTP.
2) Before sending the OTP, the user is asked for entry of a PIN or password as well.

Further embodiment C:

In case of login in or signing up on websites, connect the phone to the computer.
   1) The user opens a browser and loads the website they want to login into.
   2) The user either navigates to sign-up page or login page.
   3) The webpage detects the connected phone and tries to login automatically using the same steps as in further embodiment A.

In the above-described embodiments wherein an OTP is mentioned, an authentication token different from an OTP can be used as well, instead of or in addition to the OTP.

The invention claimed is:

1. A system for authenticating a mobile device of a user versus a third-party, the mobile device being assigned to a Mobile Network Operator MNO by a set of mobile subscriber data comprising a mobile phone number, Mobile Station Integrated Services Digital Number (MSISDN);

the system comprising:

(a) a third-party server constructed to receive from a requesting device an authentication request (REQ), requesting to authenticate the mobile device;

in reaction, send an authentication token One Time Password (OTP) to be received at the mobile device;

receive back the authentication token; and upon successful receipt back of the authentication token (OTP), acknowledge the mobile device as authenticated;

(b) the mobile device;

(c) an MNO server of the Mobile Network Operator MNO (MNO 1) to which the mobile device is assigned;

wherein:

(d) a secure routing service server constructed to communicate with the third-party server and with the MNO server;

(e) a Universal Unique User Identifier, U3I, assigned to the mobile device;

(f) the U3I of (e) being registered at the MNO server and assigned to the registered mobile phone number (MSISDN) of the user;

(g) the U3I of (e) being registered at the secure routing service server and assigned to the Mobile Network Operator MNO, wherein the secure routing service server doesn't provide of the user's mobile phone number (MSISDN);

(h) the authentication request (REQ) received at the third-party server comprising the U3I of (e);

(i) the third-party server being constructed to send the authentication token (OTP) and the U3I to the secure routing service server;

(j) the secure routing service server being constructed to receive from the third-party server the authentication token (OTP) and the U3I;

retrieve the Mobile Network Operator MNO (MNO 1) to which the U3I is assigned; and send the authentication token (OTP) and the U3I to the MNO server of the retrieved MNO (MNO 1);

(k) the MNO server constructed to receive from the secure routing service server the authentication token (OTP) and the U3I;

retrieve the mobile phone number (MSISDN) assigned to the U3I; and send the authentication token (OTP) to the mobile device using the retrieved mobile phone number (MSISDN).

2. The system according to claim 1, wherein the requesting device is the same device as the mobile device, or a device different from the mobile device.

3. The system according to claim 1, wherein the Universal Unique User Identifier, U3I, and/or the subscriber data and the mobile phone number (MSISDN) are assigned to an Embedded Universal Integrated Circuit Card (eUICC) hosted in the mobile device.

4. A method for authenticating a mobile device of a user versus a third-party, the mobile device being assigned to a Mobile Network Operator MNO by a set of mobile subscriber data comprising a mobile phone number, Mobile Station Integrated Services Digital Number (MSISDN);

the method comprising:

(a) providing a third-party server, and at the third-party server:

receive from a requesting device an authentication request (REQ), requesting to authenticate the mobile device;

in reaction, send an authentication token One Time Password (OTP) to be received at the mobile device;

receive back the authentication token (OTP); and upon successful receipt back of the authentication token (OTP), acknowledge the mobile device as authenticated;

(b) providing the mobile device;

(c) providing an MNO server of the Mobile Network Operator MNO (MNO 1) to which the mobile device is assigned;

wherein:

(d) a secure routing service server constructed to communicate with the third-party server and with the MNO server;

(e) a Universal Unique User Identifier, U3I, assigned to the mobile device;

(f) the U3I being registered at the MNO server and assigned to the registered mobile phone number (MSISDN) of the user;

(g) the U3I being registered at the secure routing service server and assigned to the Mobile Network Operator MNO (MNO 1), wherein the secure routing service server doesn't provide of the user's mobile phone number (MSISDN);

(h) the authentication (a) request received at the third-party server comprising the U3I;

wherein:

(i) by the third-party server, send the authentication token (OTP) and the U3I of (e) to the secure routing service server;

(j) by the secure routing service server:

receive from the third-party server the authentication token (OTP) and the U3I of (e);

retrieve a Mobile Network Operator MNO (MNO 1) to which the U3I is assigned; and send the authentication token and the U3I to the MNO server of the retrieved INO (MNO 1);

(k) by the MNO server:

receive from the secure routing service server the authentication token (OTP) and the U3I;

retrieve the mobile phone number (MSISDN) assigned to the U3I; and send the authentication token (OTP) to the mobile device using the retrieved mobile phone number (MSISDN).

5. The method according to claim 4, further comprising:
(i) at the third-party server or instructed by the third-party server, generate the authentication token (OTP).

6. The method according to claim 4, further comprising the steps:

(l) registering the third-party server to the secure routing service server; and upon step (j):

(j) at the secure routing service server: verify that the third-party server from which the authentication token (OTP) and the U3I are received is registered to the secure routing service server; and proceed to retrieve a Mobile Network Operator MNO and send the authentication token and the U3I to the MNO server of the retrieved MNO (MNO 1) only under the condition that the third-party server is registered.

7. The method according to claim 4, wherein step (i) by the third-party server, sending the authentication token (OTP) and the U3I of (e) to the secure routing service server, is performed via a secure communication channel, an Hypertext Transfer Protocol Secure HTTPs channel, between the third-party server and the secure routing service server.

8. The method according to claim 4, wherein the authenticating is performed on the occasion of taking over a software element offered on the third-party server for use by the mobile phone, the taking over of the software element being performed by: either downloading of the software element, an app, from the third-party server to the mobile device, or logging in to the software element, constructed to be run on the third-party server, by the mobile device;

the method further comprising the steps:
(1) registering the software element offered at the third-party server to the secure routing service server; and upon step (j):
(2) at the secure routing service server: verify that the software element offered on the third-party server for which the authentication token (OTP) and the U3I are received is registered to the secure routing service server; and
proceed to retrieve the Mobile Network Operator MNO and send the authentication token and the U3I to the MNO server of the retrieved MNO (MNO 1) only under the condition that the software element, the app, offered on the third-party server is registered.

9. The method according to claim 8, further comprising the steps:
(1) for registering, providing a secret Application Programming Interface (API) API key to the software element;
(2) upon step (j), by the software element, providing the secret API key to the secure routing service server; and by the secure routing service server, verifying the secret API key provided by the software element.

10. The method according to claim 4, wherein in step (a), the sub-step to send an authentication token (OTP) to be received at the mobile device is performed via a mobile network, via Short Message Service SMS; and/or
in step (a), the sub-step to receive from the requesting device the authentication request (REQ), requesting to authenticate the mobile device, is performed via a communication channel different from the mobile network, such that the mobile phone number MSISDN is not required for use of the communication channel; and/or
the sub-step to receive back the authentication token (OTP) is performed via a communication channel different from the mobile network, such that the mobile phone number MSISDN is not required for use of the communication channel.

11. A system for sending requested data from a third-party to a mobile device of a user, the mobile device being assigned to a Mobile Network Operator MNO by a set of mobile subscriber data comprising a mobile phone number, Mobile Station Integrated Services Digital Number (MSISDN);
the system comprising:
(a) a third-party server constructed to receive from a requesting device a data transfer request (REQ), requesting to transfer data to the mobile device;
in reaction, send the requested data to be received at the mobile device;
(b) the mobile device;
(c) an MNO server of the Mobile Network Operator MNO (MNO 1) to which the mobile device is assigned;
wherein:
(d) a secure routing service server constructed to communicate with the third-party server and with the MNO server;
(e) a Universal Unique User Identifier, U3I, assigned to the mobile device;
(f) the U3I of (e) being registered at the MNO server and assigned to the registered mobile phone number (MSISDN) of the user;
(g) the U3I of (e) being registered at the secure routing service server and assigned to the Mobile Network Operator MNO, wherein the secure routing service server doesn't provide of the user's mobile phone number (MSISDN);
(h) the data transfer request (REQ) received at the third-party server comprising the U3I of (e);
(i) the third-party server being constructed to send the requested data and the U3I to the secure routing service server;
(j) the secure routing service server being constructed to receive from the third-party server the requested data and the U3I;
retrieve the Mobile Network Operator MNO (MNO 1) to which the U3I is assigned; and
send the requested data and the U3I to the MNO server of the retrieved MNO (MNO 1);
(k) the MNO server constructed to:
receive from the secure routing service server the requested data and the U3I;
retrieve the mobile phone number (MSISDN) assigned to the U3I; and
send the requested data to the mobile device using the retrieved mobile phone number (MSISDN).

12. The system according to claim 11, wherein the Universal Unique User Identifier, U3I, and/or the subscriber data and the mobile phone number (MSISDN) are assigned to an Embedded Universal Integrated Circuit Card (eUICC) hosted in the mobile device.

13. A method for sending requested data from a third-party to a mobile device of a user, the mobile device being assigned to a Mobile Network Operator MNO by a set of mobile subscriber data comprising a mobile phone number, Mobile Station Integrated Services Digital Number (MSISDN);
the method comprising:
(a) providing a third-party server, and at the third-party server:
receive from a requesting device a data transfer request (REQ), requesting to transfer data to the mobile device;
in reaction, send the requested data to be received at the mobile device;
(b) providing the mobile device;
(c) providing an MNO server of the Mobile Network Operator MNO (MNO 1) to which the mobile device is assigned;
wherein:
(d) a secure routing service server constructed to communicate with the third-party server and with the MNO server;
(e) a Universal Unique User Identifier, U3I, assigned to the mobile device;
(f) the U3I being registered at the MNO server and assigned to the registered mobile phone number (MSISDN) of the user;
(g) the U3I being registered at the secure routing service server and assigned to the Mobile Network Operator MNO (MNO 1), wherein the secure routing service server doesn't provide of the user's mobile phone number (MSISDN);
(h) the data transfer request received at the third-party server comprising the U3I;

wherein:
(i) by the third-party server, send the requested data and the U3I of (e) to the secure routing service server;
(j) by the secure routing service server:
receive from the third-party server the requested data and the U3I of (e);
retrieve the Mobile Network Operator MINO (MNO 1) to which the U3I is assigned; and
send the requested data and the U3I to the MNO server of the retrieved MINO (MNO 1);
(k) by the MNO server:
receive from the secure routing service server the requested data and the U3I;
retrieve the mobile phone number (MSISDN) assigned to the U3I; and
send the requested data to the mobile device using the retrieved mobile phone number (MSISDN).

14. The method according to claim 13, wherein (h) the authentication (a) request or data transfer request received at the third-party server comprising the U3I is received from the mobile device;
the U3I is provided from the mobile device to the third-party server;
wherein: either the user enters the U3I to the mobile device manually for its transfer to the third-party server; or the U3I is retrieved by the mobile device from the mobile device, from an Embedded Universal Integrated Circuit Card (eUICC) hosted in the mobile device, for its transfer to the third-party server.

\* \* \* \* \*